US008367793B2

(12) United States Patent
Edmiston

(10) Patent No.: US 8,367,793 B2
(45) Date of Patent: *Feb. 5, 2013

(54) SWELLABLE MATERIALS AND METHODS OF USE

(75) Inventor: Paul L. Edmiston, Wooster, OH (US)

(73) Assignee: ABS Materials, Inc., Wooster, OH (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/560,002

(22) Filed: Sep. 15, 2009

(65) Prior Publication Data

US 2010/0096334 A1    Apr. 22, 2010

Related U.S. Application Data

(63) Continuation-in-part of application No. 11/537,944, filed on Oct. 2, 2006, now Pat. No. 7,790,830.

(60) Provisional application No. 60/722,619, filed on Sep. 30, 2005.

(51) Int. Cl.
  *C08G 77/60* (2006.01)
(52) U.S. Cl. ............. 528/35; 528/34; 528/491; 524/588
(58) Field of Classification Search .................... 528/35, 528/491; 524/588
  See application file for complete search history.

(56) References Cited

U.S. PATENT DOCUMENTS

| | | | |
|---|---|---|---|
| 5,563,707 A | 10/1996 | Prass et al. | |
| 7,358,318 B1 | 4/2008 | Tavlarides et al. | |
| 2002/0070168 A1 | 6/2002 | Jiang et al. | |
| 2002/0185444 A1 | 12/2002 | Coronado et al. | |
| 2004/0169157 A1 | 9/2004 | Coronado et al. | |
| 2006/0113231 A1 | 6/2006 | Malik | |
| 2007/0059211 A1 | 3/2007 | Edmiston | |
| 2007/0073095 A1* | 3/2007 | White et al. ................. | 588/306 |
| 2007/0112242 A1 | 5/2007 | Edmiston | |
| 2007/0122333 A1 | 5/2007 | Yang | |
| 2009/0028912 A1 | 1/2009 | Dave | |
| 2009/0098082 A1 | 4/2009 | Wilson et al. | |
| 2010/0096334 A1 | 4/2010 | Edmiston | |
| 2010/0113856 A1 | 5/2010 | Edmiston | |

FOREIGN PATENT DOCUMENTS

WO    WO-2005/028604 A1    3/2005

OTHER PUBLICATIONS

Boury et al., "Auto-Organization in Sol-Gel Type Polycondensation: A Door to the Nanosciences," *The Chemical Record*, 3(2):120-132 (2003).

Burkett et al., "Highly Swellable Sol-Gels Prepared by Chemical Modification of Silanol Groups Prior to Drying", *Journal of Non-Crystalline Solids*, 351:3174-3178 (2005).
Burkett et al., "Organic-Inorganic Hybrid Materials that Rapidly Swell in Non-Polar Liquids: Nanoscale Morphology and Swelling Mechanism", *Chem. Mater.*, 20:1312-1321 (2008).
Cerveau et al., "Influence of Kinetic Parameters on the Textural and Chemical Properties of Silsesquioxane Materials Obtained by Sol-Gel Process", *J. Mater. Chem.*, 9:1149-1154 (1999).
Cerveau et al., "Sol-Gel Process: Influence of the Temperature on the Textural Properties of Organosilsesquioxane Materials", *J. Mater. Chem.*, 10:1617-1622 (2000).
Cerveau et al., "Nanostructured Organic-Inorganic Hybrid Materials: Kinetic Control of the Texture", *Chem. Mater.*, 13:3373-3388 (2001).
Dave et al., "Osmoresponsive Glasses: Osmotically Triggered Volume Changes of Organosilica Sol-Gels as a Means for Controlled Release of Biomolecules", *Adv. Mater.*, 18:2009-2013 (2006).
Edmiston et al., "Absorption of Dissolved Organic Species from Water Using Organically Modified Silica that Swells", *Separation and Purification Technology*, 66:532-540 (2009).
Kurumada et al., "Structure and Formation Process of Silica Microparticles and Monolithic Gels Prepared by the Sol-Gel Method", *Colloids and Surfaces A: Physicochemical and Engineering Aspects*, 139:163-170 (1998).
Mendi et al., "Synthesis of Large-Pore Ordered Mesoporous Silicas Containing Aminopropyl Groups", *New J. Chem.*, 29:965-968 (2005).
Rao et al., Thermoresponsive Glasses: Temperature-Controlled Rapid Swelling and Deswelling of Silica-Based Sol-Gels, *Adv. Mater.*, 13(4):274-276 (2001).
Rao et al., "Smart Glasses": Molecular Programming of Rapid Dynamic Responses in Organosilica Sol-Gels, *Adv. Mater.*, 14(6):443-447 (2002).
Rao et al., "Smart Glasses: Molecular Programming of Dynamic Responses in Organosilica Sol-Gels", *Journal of Sol-Gel Science and Technology*, 26:553-560 (2003).
Reale et al., "A Fluoride-Catalyzed Sol-Gel Route to Catalytically Active Non-Ordered Mesoporous Silica Materials in the Absence of Surfactants", *J. Mater. Chem.*, 15:1742-1754 (2005).
A International Search Report dated Nov. 2, 2010 for PCT International Application No. PCT/US2010/048670, filed Sep. 13, 2010 (4 pgs.).

* cited by examiner

*Primary Examiner* — Kuo-Liang Peng
(74) *Attorney, Agent, or Firm* — Arent Fox LLP

(57) ABSTRACT

One aspect of the present invention includes a swellable sol-gel composition including a plurality of interconnected organosilica nanoparticles. Another aspect of the present invention includes a swellable composite including a plurality of interconnected organosilica nanoparticles and a particulate material capable of binding to or reacting with a non-polar or organic sorbate. When dried, the sol-gel composition and the swellable composite may be capable of swelling to at least twice their dried volume when placed in contact with a non-polar or organic sorbate.

19 Claims, 11 Drawing Sheets

SWELLABLE MATERIALS AND METHODS OF USE

RELATED APPLICATIONS

This application is a continuation-in-part of U.S. patent application Ser. No. 11/537,944, filed Oct. 2, 2006, now U.S. Pat. No. 7,790,830, which claims priority from U.S. Provisional Patent Application Ser. No. 60/722,619, filed on Sep. 30, 2005. The subject matter of the aforementioned applications is hereby incorporated by reference in their entireties.

TECHNICAL FIELD

The present invention generally relates to swellable materials and methods of use, and more particularly to swellable sol-gels capable of swelling to at least twice their dried volume when placed in contact with a non-polar or organic sorbate.

BACKGROUND OF THE INVENTION

Polymeric materials that have the ability to swell may be useful in a variety of applications. The mechanism of swelling depends on the occurrence of molecular-level processes that are dictated by physical and chemical properties of the materials (Escobedo et al., *Phys. Report* 318:85 (1999)).

Sol-gel synthesis is a relatively simple and versatile method to prepare organic/inorganic polymers with diverse morphologies and chemical compositions (Wright, *Sol-Gel Materials: Chemistry and Applications*, Gordon and Breach Science Publ., Amsterdam (2001)). In contrast to hydrophilic polymers prepared from biomaterials (Khalid et al., *Eur, J. Pharm. Sci.* 15:425 (2002); Elvira et al., *Biomaterials* 1955 (2002)), dried sol-gels (or zerogels) composed of polymerized alkoxysilanes generate a $SiO_2$ matrix that is inelastic and not prone to extensive swelling in solvents when fully dried. The lack of swelling is likely due to considerable condensation reactions that occur during the gelation and drying processes and crosslink the polymeric sol-gel material (Brinker et al., *Sol-Gel Science. The Physics and Chemistry of Sol-Gel Processing*, Academic Press (San Diego), Chapter 9 (1990)). Due to the inherent chemical structure of sol-gel derived materials, there are few reports of swellable silica solids prepared via sol-gel methods. Some sol-gel compositions have been formulated using amine-bridged silane precursors that swell in response to changes in pH (Rao et al., *J. Sol-Gel Sci. and Tech.* 26:553 (2003)) or temperature (Rao et al., *Adv. Mater.* 13:274 (2001); Rao et al., *Adv. Mater.* 14:443 (2002)) to generate "smart" materials. These amine-bridged sol-gels are only capable of very limited swelling.

SUMMARY OF THE INVENTION

The present invention generally relates to a swellable materials and methods of use, and more particularly to swellable sol-gels capable of swelling to at least twice their dried volume when placed in contact with a non-polar or organic sorbate.

According to one aspect of the present invention, a swellable sol-gel composition can comprise a plurality of interconnected organosilica nanoparticles. When dried, the sol-gel composition may be capable of swelling to at least twice its dried volume when placed in contact with a non-polar or organic sorbate.

According to another aspect of the present invention, a swellable composite can comprise a plurality of interconnected organosilica nanoparticles and a particulate material capable of binding to or reacting with a non-polar or organic sorbate. When dried, the swellable composite may be capable of swelling to at least twice its dried volume when placed in contact with a non-polar or organic sorbate.

According to another aspect of the present invention, a composition for treating contaminated water and soils can comprise a plurality of interconnected organosilica nanoparticles. When dried, the composition may be capable of swelling to at least twice its dried volume when placed in contact with a non-polar or organic sorbate or an aqueous solution containing a non-polar organic sorbate.

According to another aspect of the present invention, a method is provided for making a swellable composite. One step of the method can include providing a plurality of organosilica nanoparticles comprising residual silanols and a particulate material. The residual silanols can be derivatized with a reagent having at least one group that is reactive with the residual silanols and at least one alkyl group. The swellable composite can then be dried.

According to another aspect of the present invention, a method is provided for remediating a contaminated fluid or soil containing a non-polar or organic sorbate. One step of the method can include contacting a contaminated fluid or soil with a swellable composite under conditions effective to cause the swellable composite to take up the non-polar or organic sorbate. The swellable composite can comprise a plurality of interconnected organosilica nanoparticles that, when dried, is capable of swelling at least twice its dried volume when placed in contact with the non-polar or organic sorbate.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Unless otherwise defined, all technical terms used herein have the same meaning as commonly understood by one of ordinary skill in the art to which the present invention pertains.

In the context of the present invention, the term "swellable" can refer to the ability of a swellable material to swell greater than about 2 times its dried volume when placed in contact with a non-polar or organic sorbate. For example, the swellable material can swell greater than about 3 times, 4 times, 5 times, 6 times, 7 times, or greater its dried volume when placed in contact with a non-polar or organic sorbate or an aqueous solution containing such sobate.

As used herein, the terms "non-polar sorbate" and "organic sorbate" can refer to a substance that is capable of being taken up by the swellable material of the present invention, whether by adsorption, absorption, or a combination thereof. Examples of non-polar sorbates can include organic solvents, such as ethanol, acetonitrile, methyl-t-butyl ether, and dichloromethane. Examples of organic sorbates can include hydrocarbons, such as hexane and octane, aromatic hydrocarbons, such as benzene, toluene, xylene, naphthalene, nitrobenzene, phenol, and m-nitrophenol, and chlorinated organics, such as trichloroethylene, perchloroethylene, dichloroethylene, vinyl chloride and polychlorinated biphenyls.

The present invention generally relates to swellable materials and methods of use, and more particularly to swellable sol-gels capable of swelling to at least twice their dried volume when placed in contact with a non-polar or organic sorbate. The swellable sol-gel materials are hydrophobic and do not swell in the presence of water or water vapor. Absorption by the swellable sol-gel materials is non-selective and can be induced by non-polar or organic sorbates ranging from methanol to hexane. Uptake of non-polar or organic sorbates generates forces greater than 100 N/g as the swellable sol-gel materials rapidly expand. Additionally, swelling and absorption are driven by the release of stored tensile force rather than by chemical reaction. In fact, swelling is completely reversible if absorbed sorbates are removed by evaporation or rinse/drying. The swellable sol-gel materials can also include a particulate material that is capable of binding to or reacting with non-polar or organic sorbates.

Figure 2:
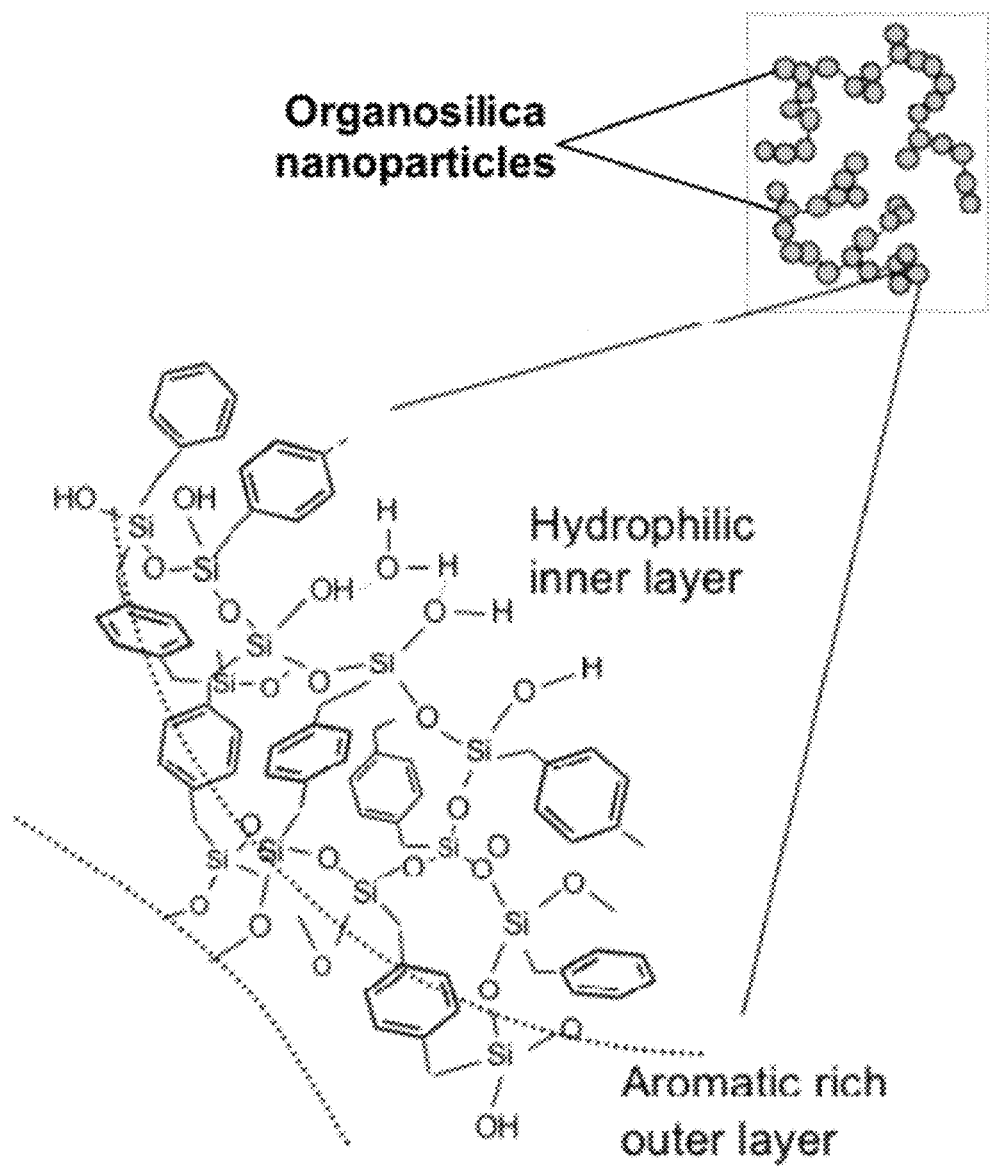
FIG. 2 is a schematic illustration showing swellable organosilica nanoparticles that include a hydrophilic inner layer and an aromatic rich outer layer.

The swellable sol-gel composition includes a plurality of flexibly tethered and interconnected organosilica particles having diameters on the nanometer scale. The plurality of interconnected organosilica nanoparticles can form a disorganized microporous array or matrix defined by a plurality of cross-linked aromatic siloxanes. As shown in FIG. 2, the organosilica nanoparticles can have a multilayer configuration comprising a hydrophilic inner layer and a hydrophobic, aromatic-rich outer layer. As described in greater detail below, the organosilica nanoparticles can be formed from bridged polysiloxanes that include an aromatic bridging group, which is flexibly linked between silicon atoms of the polysiloxanes.

Figure 1:
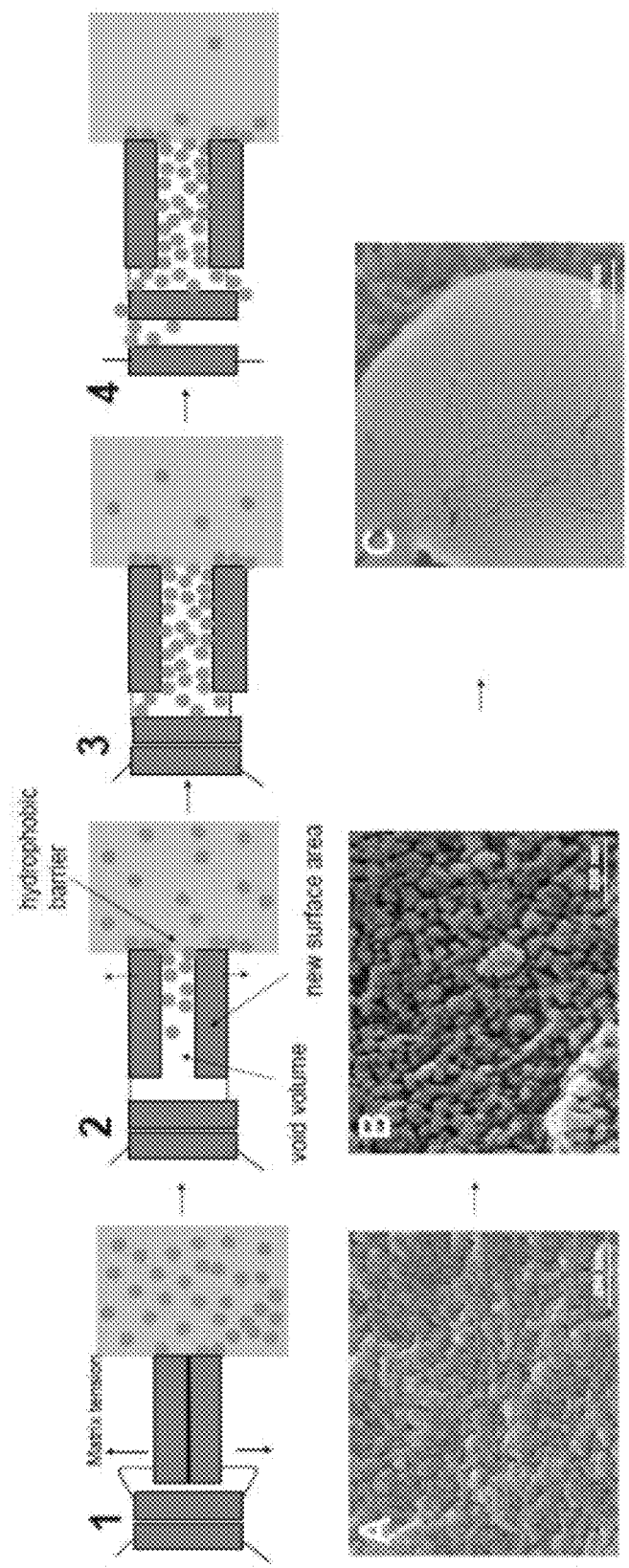
FIG. 1 is a schematic illustration showing a proposed model for absorption of dissolved organics by the swellable materials of the present invention (1—initial adsorption to the surface of the material; 2—sufficient adsorption occurs to trigger matrix expansion leading absorption across the material-water boundary; 3—pore filling leading to further percolation into the material; 4—continued material expansion increases available void volume) based on electron microscopy (A—swellable material in the dry non-swollen state; B—the material partially swollen corresponding to 2 in model; C—material fully swollen corresponding to 3 and 4 in model)

The swellable sol-gel materials have the ability to swell to at least twice their dried volume when placed in contact with a non-polar or organic sorbate. Without being bound by theory, it is believed that swelling may be derived from the morphology of interconnected organosilica particles that are crosslinked during the gel state to yield a nanoporous material or polymeric matrix. Upon drying the gel and following the derivatization step, tensile forces may be generated by capillary-induced collapse of the polymeric matrix. Stored energy can be released as the matrix relaxes to an expanded state when non-polar or organic sorbates disrupt the inter-particle interactions holding the dried material in the collapsed state. New surface area and void volume may then be created, which serves to further capture additional non-polar or organic sorbates that can diffuse into the expanded pore structure (FIG. 1).

The swellable sol-gel materials can be formed in a similar manner as described in parent U.S. patent application Ser. No. 11/537,944. Briefly, the organosilica nanoparticles can be formed from bridged silane precursors having the structure:

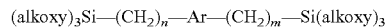

$$(\text{alkoxy})_3\text{Si}—(\text{CH}_2)_n—\text{Ar}—(\text{CH}_2)_m—\text{Si}(\text{alkoxy})_3$$

wherein n and m can individually be an integer from 1 to 8, Ar can be a single-, fused-, or poly-aromatic ring, and each alkoxy can independently be a C1 to C5 alkoxy. Examples of bridged silane precursors can include 1,4-bis(trimethoxysilylmethyl)benzene, bis(trimethoxysilylethyl)benzene (BTEB), and mixtures thereof.

Conditions for sol-gel formation can include polymerization of bridged silane precursor molecules using acid or base catalysts in appropriate solvents. Examples of base catalysts can include tetrabutyl ammonium fluoride (TBAF), sodium fluoride (or other fluoride salts), 1,5-diazabicyclo[4.3.0]non-5-ene (DBN), and alkylamines (e.g., propyl amine). Examples of solvents for use with base catalysts can include tetrahydrofuran (THF), acetone, and dichloromethane/THF mixtures. Examples of acid catalysts can include any strong acid, such as hydrochloric acid, phosphoric acid, and sulfuric acid. Solvents for use with acid catalysts can include those identified above for use with base catalysts.

After gellation, the material is preferably aged for an amount of time suitable to induce syneresis, which is the shrinkage of the gel that accompanies solvent evaporation. The aging drives off much but not necessarily all of the solvent. While aging times may vary depending upon the catalyst and solvent used to form the gel, aging is typically carried out for about 15 minutes up to about 7 days, preferably from about 1 hour up to about 4 days. Aging can be carried out at room temperature or elevated temperature (i.e., from about 18° C. up to about 60° C.), either in open atmosphere, under reduced pressure, or in a container or oven.

Solvent and catalyst extraction (i.e., rinsing) can be carried out after or during the aging process. Preferred materials for extraction include, without limitation, any organic solvent of medium polarity, e.g., THF, acetone, ethanol, and acetonitrile, either alone or in combination.

Figure 11:
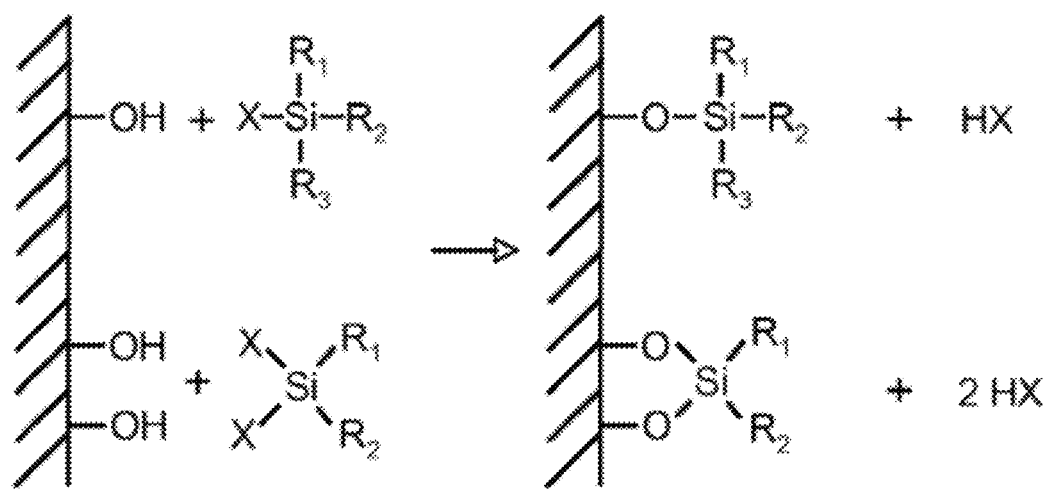
FIG. 11 shows exemplary derivatization reactions used to prepare the swellable sol-gel materials of the present invention. Silanol groups (Si—OH) on the surface of the sol-gel are reacted with silanes having either 1 or 2 silanol-reactive reactive groups, designated X, and either two or three organic groups, respectively (designated $R_1$, $R_2$ and $R_3$).

After rinsing, the sol-gel is characterized by the presence of residual silanols (see FIG. 11). The silanol groups allow for derivatization of the gel using any reagent that includes both one or more silanol-reactive groups and one or more non-reactive alkyl groups. The derivatization process results in the end-capping of the silanol-terminated polymers present within the sol-gel.

One suitable class of derivatization reagents includes halosilane reagents that contain at least one halogen group and at least one alkyl group. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane. A diagram of two exemplary derivatization reactions using these halosilane reagents is shown in FIG. 11. The alkyl groups of the reagent may be any alkyl, and the modifier may contain more than one alkyl group. The alkyl groups, as used herein, can be aliphatic or non-aliphatic hydrocarbons containing up to about 30 carbons, with or without one or more hetero atoms (e.g., S, O, N, P, halo), including straight-chain hydrocarbons, branched-chain hydrocarbons, cyclic hydrocarbons, and aromatic hydrocarbons.

Another suitable class of derivatization reagents includes silazanes or disilazanes. Any silazane with at least one reactive group X and at least one non-reactive R group (alkyl, as defined in the preceding paragraph) can be used. A preferred disilazane is hexamethyldisilazane.

After derivatizing, the derivatized gels are preferably rinsed in any of the rinsing agents described above, and then dried. Drying can be carried out under any suitable conditions, but preferably in an oven, e.g., for about 2 hr at about 60° C.

The swellable sol-gel materials can also be used to form a swellable composite that includes a plurality of interconnected organosilica nanoparticles and a particulate material that is capable of binding to or reacting with a non-polar or organic sorbate. The swellable composite is hydrophobic, resistant to absorbing water, and capable of swelling to at least twice its dried volume when placed in contact with a non-polar or organic sorbate. As discussed below, the swellable composite can be used for a variety of applications, including chemical remediation and extraction from aqueous systems.

The particulate material can comprise any reactive or catalytic material that is capable of binding to or reacting with the non-polar or organic sorbate. For example, the particulate material can comprise a reactive metal that is capable of reducing organic sorbates, such as halogenated sorbates. Examples of reactive metals can include transition metals, such as zero valent iron (ZVI), palladium, gold, platinum, nickel and zinc. Other types of reactive or catalytic materials that may be used as the particulate material can include multifunctional solids that are catalytically active, such as zeolites (e.g., analcime, chabazite, clinoptilolite, heulandite, natrolite, phillipsite and stilbite), alumina, and activated/graphitic carbon as well as other reactive transition metals, alloys, metal oxides, and/or ceramics.

Figure 3:
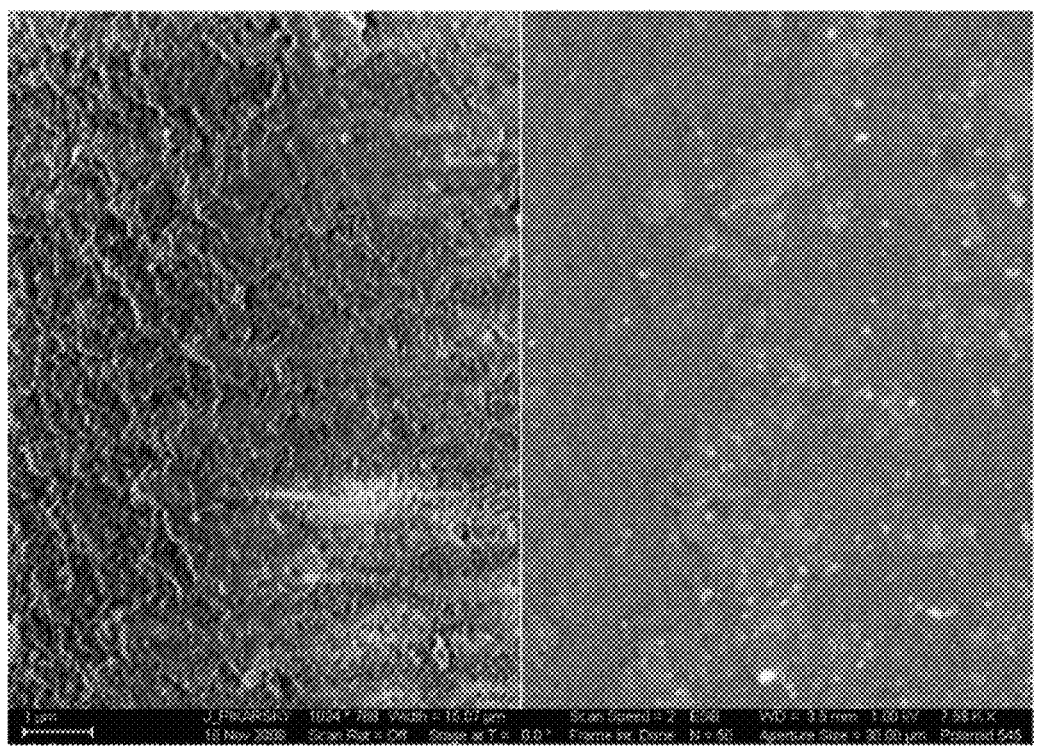
FIG. 3 is a series of electron micrographs showing a swellable composite that includes a plurality of interconnected organosilica nanoparticles and a particulate material. The left panel shows standard mode and the right panel shows backscattered energy discrimination (bright spots indicate the particulate material)

The particulate material can be entrapped within or disposed on the porous matrix or array of the swellable sol-gel material in a uniform or random configuration. As shown in FIG. 3, for example, the particulate material can be randomly dispersed throughout the swellable sol-gel material. Advantageously, particulate material entrapped within the porous matrix of the sol-gel can be potentially protected by the sol-gel to mitigate deactivation and/or poisoning of the particulate material.

The amount of particulate material that is provided in the sol-gel can be about 0.1% to about 10%, about 0.25% to about 8%, or, for example, about 0.5% to about 5% by weight of the sol-gel material.

The swellable sol-gel material can also include at least one metal catalyst deposited or coated onto a surface of the particulate material. As described below, the valency of the metal catalyst can be reduced to zero by the particulate material and result in the deposition of the metal catalyst onto at least one surface of the particulate material. The metal catalyst can be any one or combination of transition metals, such as palladium, nickel, and zinc. In one example of the present invention, the metal catalyst can comprise palladium.

One example of a swellable composite can include a plurality of interconnected organosilica nanoparticles formed from polymerized BTEB molecules and a particulate material comprising nano-sized ZVI particles. The nano-sized ZVI particles can be uniformly or randomly dispersed on or within the porous matrix or array formed by the polymerized BTEB molecules. The swellable composite can additionally or optionally include a metal catalyst, such as palladium. The palladium ions can be reduced to zero valent palladium by the ZVI and result in the deposition of palladium onto at least one surface of the nano-sized ZVI particles.

The nano-sized ZVI particles may be capable of reducing halogenated organic sorbates in aqueous solution, such as trichloroethylene (TCE). Without being bound by theory, it is believed that the mechanism by which the swellable composite removes and dechlorinates species in aqueous solution proceeds as shown below:

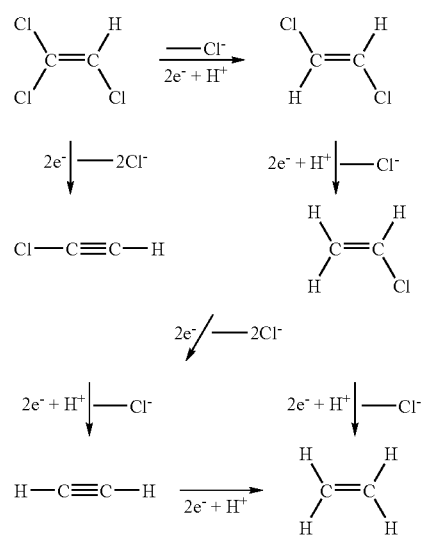

Immediately after introduction into water, for example, the swellable composite may absorb halogenated organic sorbates, such as TCE. The swellable composite can have the capacity for at least twice the volume of TCE per volume of the swellable composite, thereby causing swelling of the composite. Once TCE is absorbed, TCE can remain in intimate contact with the nano-sized ZVI particles distributed throughout the swellable composite. Contact with the nano-sized ZVI particles can lead to reductive chlorination reactions. A source of protons for the reaction can come from either tightly absorbed water left over during synthesis, or from co-absorbed organic acids that are either naturally occurring or injected with the swellable composite (e.g., biodegradable surfactants or modifying agents).

Figure 4:
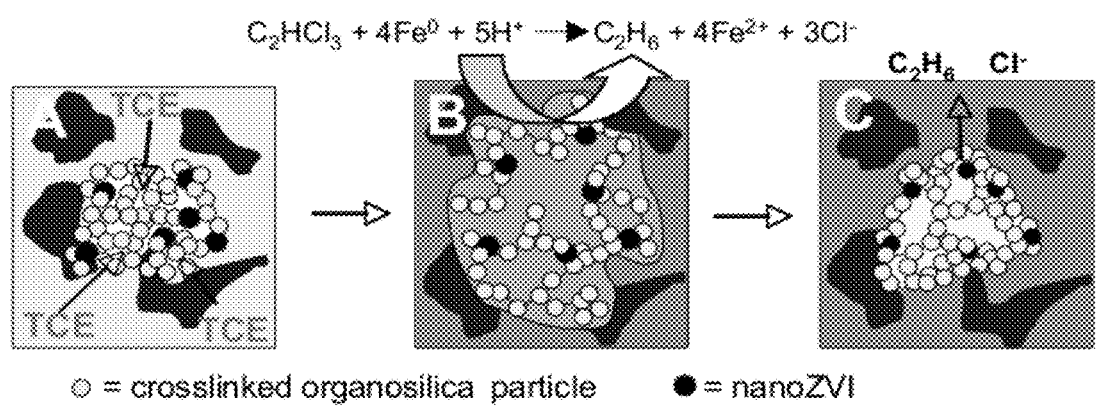
FIGS. 4A-C are a series of illustrations depicting the use of a swellable composite for TCE remediation.

Dechlorination reactions can proceed until the resulting final products, i.e., ethylene and chloride ions are created. Ethylene is gaseous and can diffuse from the swellable composite to create space for additional chlorinated species. Chloride ions are charged and can migrate from the swellable composite via a thermodynamic driving force to dissolve in the surrounding aqueous medium (FIG. 4). The cycle of absorption-reaction-desorption can continue until the entrapped ZVI is depleted. At this point, the swellable composite may absorb chlorinated solvents.

Figure 5:
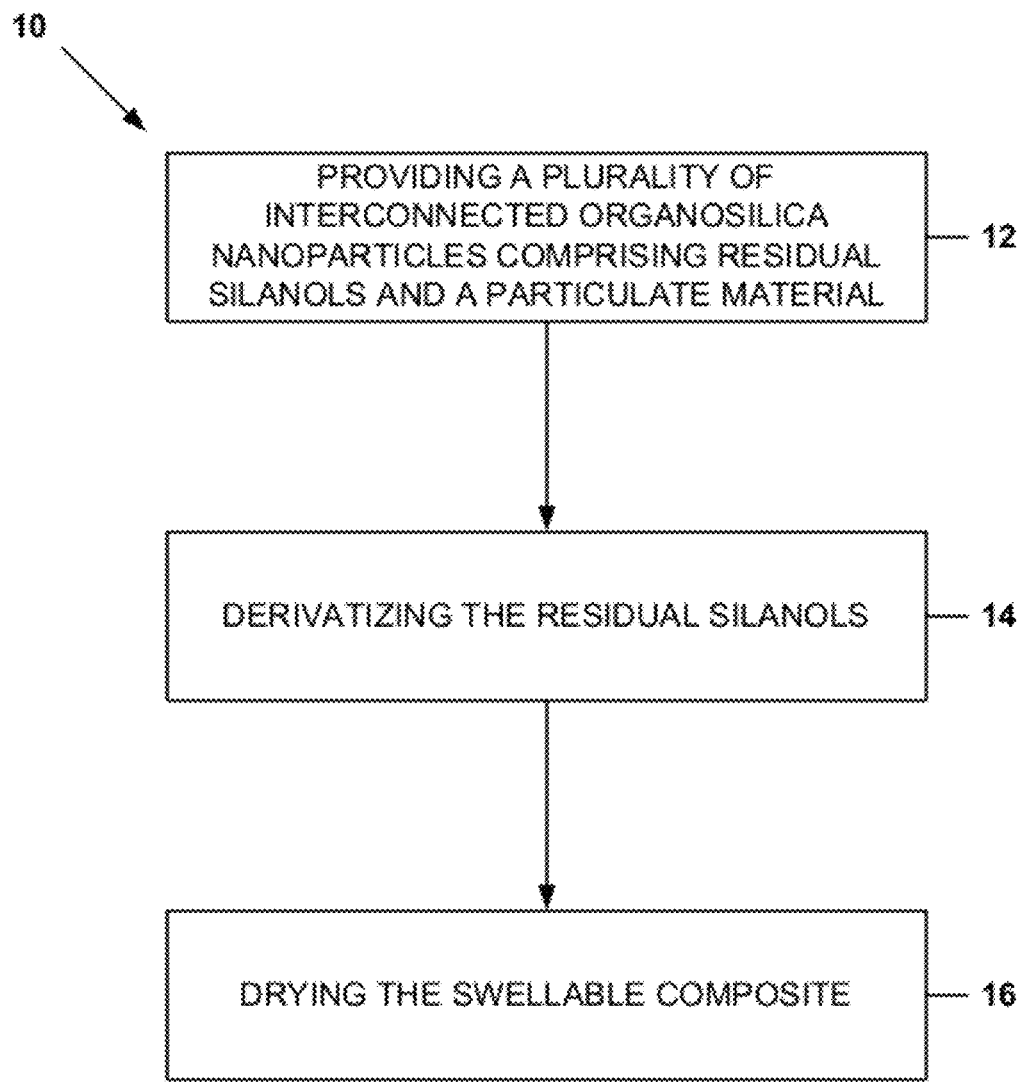
FIG. 5 is a process flow diagram illustrating a method for making a swellable composite according to another aspect of the present invention.

FIG. 5 illustrates a method 10 for preparing a swellable composite in accordance with an aspect of the invention. In the method 10 at step 12, a plurality of interconnected organosilica nanoparticles having residual silanols and a particulate material can be provided. The organosilica nanoparticles can be formed from a plurality of bridged silane precursors having the structure:

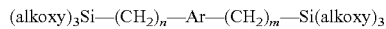

$(alkoxy)_3Si—(CH_2)_n—Ar—(CH_2)_m—Si(alkoxy)_3$ wherein n and m can individually be an integer from 1 to 8, Ar can be a single-, fused-, or poly-aromatic ring, and each alkoxy can independently be a C1 to C5 alkoxy. Examples of bridged silane precursors can include 1,4-bis(trimethoxysilylmethyl)benzene, BTEB, and mixtures thereof.

To prepare the organosilica nanoparticles, a plurality of bridged silane precursor molecules can be mixed with a solvent. For example, about 100 parts (as measured by volume) solvent can be mixed (e.g., stirred) with about 15 to about 40 parts of BTEB to form a reaction mixture. The bridged silane precursor molecules may be present in the reaction mixture at between about 0.25M and about 1M. Examples of solvents that may be mixed with the bridged silane precursor molecules can include THF, acetone, dichloromethane/THF mixtures containing at least about 15% by volume THF, and THF/acetonitrile mixtures containing at least about 50% by volume THF.

Prior to polymerizing the bridged silane precursor molecules, the particulate material can be added to the reaction mixture. The particulate material can include a reactive metal capable of reducing organic sorbates, such as halogenated sorbates. For example, the particulate material can comprise a reactive metal including at least one of zero valent iron (ZVI), palladium, gold, platinum, nickel, zinc, and combinations thereof. The particulate material can comprise about 0.5% to about 5% by weight of the swellable composite. For example, about 0.01 to about 10 parts of nanosized ZVI particles can be stirred into the reaction mixture prior to polymerization of the bridged silane precursor molecules.

After addition of the particulate material, a catalytic solution comprising a stoichiometric amount of water and a catalyst can be rapidly added to the reaction mixture to catalyze the hydrolysis and condensation of the bridged silane precursor molecules. Conditions for polymerizing (or gelling) bridged polysiloxanes are known in the art and can include the use of acid or base catalysts in appropriate solvents. Examples of base catalysts that can be used include TBAF, DBN, and alkylamines (e.g., propyl amine). Solvents that may be used with base catalysts include THF, acetone, dichloromethane/THF mixtures containing at least about 15% by volume THF, and THF/acetonitrile mixtures containing at least about 50% by volume THF. Examples of acid catalysts can include any strong acid, such as hydrochloric acid, phosphoric acid, and sulfuric acid. Examples of solvents for use with acid catalysts can include those identified above for use with base catalysts.

To polymerize a reaction mixture comprising THF and BTEB, for example, a catalytic solution comprising a stoichiometric amount of water and about 1 part TBAF can be rapidly added to the reaction mixture. After addition of the catalytic solution, water can react with the alkoxysilane groups and fluoride ions can catalyze the hydrolysis and polycondensation of the BTEB to form a gel-like composite.

After gellation, the composite can be aged for an amount of time sufficient to induce syneresis, i.e., the shrinkage of the gel composite that accompanies further polycondensation. During syneresis the volume of the gel typical decreases approximately 10%. While aging times may vary depending upon the catalyst and solvent used to form the gel, aging can typically be carried out for about 15 minutes up to about 7 days. Aging can be carried out at room temperature or elevated temperature (e.g., from about 18° C. up to about 60° C.). Additionally, aging can be carried out either in an open atmosphere, under reduced pressure, or in a container or oven.

Solvent and catalyst extraction can be carried out (e.g., rinsing) after or during the aging process. Examples of materials that can be used for solvent and catalyst extraction include any organic solvent of medium polarity, e.g., THF, acetone, ethanol, acetonitrile, or combinations thereof.

After rinsing, the residual silanols can be derivatized at Step 14 with a reagent having at least one group that is reactive with the residual silanols and at least one alkyl group. For example, a gel comprising BTEB can be treated with a solution comprising a derivatizing reagent, such as about 1% or more of hexamethyldisilazane. Step 14 can result in the end-capping of the silanol-terminated polymers present within the gel.

One class of reagents that can be used at Step 14 can include halosilane reagents containing at least one halogen group and at least one alkyl group. The halogen group can be any halogen, such as Cl, Fl, I, or Br. Halosilanes or dihalosilanes can include chlorosilanes, dichlorosilanes, fluorosilanes, difluorosilanes, bromosilanes, dibromosilanes, iodosilanes, and di-iodosilanes. Additional examples of halosilanes can include cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane. The alkyl groups of the reagent may be any alkyl. For example, the alkyl groups can be aliphatic or nonaliphatic hydrocarbons containing up to about 30 carbons, with or without one or more hetero atoms (e.g., S, O, N, P, and halo), such as straight-chain hydrocarbons, branched-chain hydrocarbons, cyclic hydrocarbons, and aromatic hydrocarbons.

Another class of derivatization reagents can include silazanes or disilazanes (e.g., hexamethyldisilazane). For example, any silazane with at least one reactive group and at least one non-reactive group (e.g., an alkyl) can be used.

At Step 16, the derivatized gel can be rinsed and dried. Drying can be carried out under any appropriate condition. For example, the derivatized gel can be dried for about 15 minutes to about 3 hours at about 40° C. to about 120° C. Upon drying the derivatized gel, the particulate material (e.g., nano-sized ZVI particles) may be randomly distributed through and/or highly entrapped in the porous matrix comprising the swellable composite.

The dried composite can be maintained in either a monolithic form or crushed/ground into a powdered form. Monolithic composites can be formed in any desired shape and size suitable for a particular application. For example, a reaction mixture comprising a plurality of bridged silane precursor molecules, an appropriate solvent, and a particulate material can be cast in a container having a desired internal configuration and dimension. After polymerization, the resultant gel composite will conform to the desired size and shape of the container. For other applications, such as remediation and recovery of non-polar or organic sorbates (discussed below), it may be desirable to crush or ground the swellable composite into powder form. Depending upon the manner in which grinding of the monolith is carried out to obtain the powdered form, the resultant particle sizes may vary widely. For example, a powdered swellable composite may have an average particle size that is less than about 250 μm. Powdered forms of the composite are characterized by a high surface area, which can allow more rapid and effective uptake of non-polar or organic sorbates.

In another aspect of the present invention, at least one metal catalyst can be deposited or coated onto a surface of the particulate material. The metal catalyst can include any one or combination of transition metals, such as palladium, nickel, and zinc. In one example of the present invention, the metal catalyst can comprise palladium.

The metal can be deposited or coated on particulate material after the composite is dried at Step 16 by, for example treating the composite with a solution containing an appropriate amount of a desired metal catalyst and a solvent. The solvent can include an alcohol, such as ethanol, methanol, or isopropanol. In one example, an equal volume of about 50 mM palladium acetate solution can be combined with ethanol and then used to treat a composite comprising polymerized BTEB and nano-sized ZVI particles. In this example, the palladium ions can be reduced to zero valent palladium by the ZVI and result in the deposition of palladium onto at least one surface of the nano-sized ZVI particles.

The extent of metal catalyst deposition on the surface of the particulate material may be controlled by the total reaction time between the swellable composite and the solution containing the metal catalyst. The reaction time can be from about 30 minutes to about 4 hours. At a desired time, any excess of the solution containing the metal catalyst can be removed by successive rinse steps using an alcohol and/or other solvent. The composite can then be dried at about 100° C. for an appropriate period of time.

The swellable composite can be used in a method for remediating a contaminated fluid or soil containing a non-polar or organic sorbate. The terms "remediating" and "remediation" can refer to the substantially complete removal of soil and fluid pollutants (i.e., non-polar and organic sorbates) to achieve the standard(s) set by the responsible regulatory agency for the particular contaminated soil or fluid (e.g., National Primary Drinking Water Regulations for subsurface ground water). One example of soil and fluid pollutants that can be remediated by the present invention can include halogenated organic sorbates, such as tetrachloroethene (PCE), carbon tetrachloride (CT), TCE, trichloromethane (TCM), c is 1,2-dichloroethene (cDCE), tribromomethane (TBM), trans 1,2-dichloroethene (tDCE), 1,2-dibromoethane (12EDB), 1,1-dichloroethene (11DCE), trichlorofluoroethane (Freon 113), vinyl chloride (VC), trichlorofluoromethane (Freon 11), hexachloroethane (HCA), 1,1,2,2-tetrachloroethane (1122TeCA), 1,2,3-trichloropropane (123TCP), 1,1,1,2-tetrachloroethane (1112TeCA), 1,2-dichloropropane (12DCP), 1,1,1-trichloroethane (111TCA), lindane, 1,1,2-trichloroethane (112TCA), hexachlorobutadiene (HCBD), 1,1-dichloroethane (11DCA), polychlorinated biphenyls having the formula $C_{12}H_{10-x}Cl_x$ where x is an integer>1 and <11, organochlorine pesticides, such as atrazine, or halogenated species used as chemical weapons, such as ethyldichloroarsine or phosgene. Substances susceptible to reduction, such as nitroaromatic compounds, such as trinitrotoluene are also targets for the swellable composite material.

One step of the method can include contacting a contaminated fluid or soil containing a non-polar or organic sorbate with a swellable composite. The swellable composite can be formed according to the method 10 (as described above). For example, the swellable composite can comprise a plurality of interconnected organosilica nanoparticles and a particulate material that is capable of binding to reacting with the non-polar or organic sorbate. To account for the hydrophobicity of the swellable composite, the swellable composite can be mixed with at least one of a biodegradable surfactant or modifying agent that facilitates administration of the composition into water or soil. Examples of biodegradable surfactants or modifying agents can include sodium dodecylsulfate, organic acids (e.g., citric and acetic acid), and ethanol. Acidic slurry components (e.g., citric acid and acetic acid) have the added benefit of being co-absorbed by the swellable composite and providing a proton source for dechlorination reactions.

The slurry can be contacted with the contaminated fluid or soil using any appropriate technique and/or equipment. Where the contaminated soil comprises an aquifer polluted with a halogenated organic sorbate, for example, the slurry can be directly injected into the soil using standard equipment and methods, such as sonic drilling or hydraulically-powered percussion/probing (e.g., GEOPROBE, Geoprobe Systems, Salina, Kans.). The amount of slurry to be contacted with the contaminated soil or fluid will depend upon the concentration of the non-polar or organic sorbate and/or the volume of fluid or soil to be remediated. Upon contact with the contaminated fluid or soil, the organic sorbates are extracted into the swellable composite whereby particulate material can subsequently reduce the non-polar or organic sorbate. As described in more detail below, the cycle of absorption-reaction-desorption can continue until the entrapped particulate material is chemically depleted through reaction with sorbates.

In one example of the method, a swellable composite can be used to remediate chlorinated solvents (e.g., TCE) from groundwater. The swellable composite can be formed by mixing about 100 parts (as measured by volume) of solvent (e.g., acetone or THF) with about 15-40 parts of BTEB to form a reaction mixture. After stirring the reaction mixture, a solution comprising a stoichiometric amount of water and about 1 part TBAF can be rapidly added to the reaction mixture. Next, about 0.01 to about 10 parts of nano-sized ZVI particles can be added into the reaction mixture and stirred into solution. The resultant solution can form a gel within about 10 minutes. Following gellation, the gel can age for about 1 hour to about 1 week. The aged gel can then be rinsed with a solvent to extract any water, fluoride ions, and other residual reagents. The rinsed gel can then be treated with a solution comprising a derivatizing reagent and a solvent (e.g., a solution comprising greater than about 1% hexamethyldisilazane). After a period of time (e.g., about 1 hour to about 1 week), the derivatized gel can be rinsed to remove any excess reagent (e.g., hexamethyldisilazane). The derivatized gel can then be dried at about 100° C. to form the swellable composite.

After forming the swellable composite, the composite can be mixed with at least one of a biodegradable surfactant or modifying agent. For example, the slurry can comprise about 1 part of the swellable composite, about 3-5 parts of an additional biodegradable surfactant or modifying agent, and about 10-20 parts water. The resultant slurry can be directly injected into the contaminated soil or aquifer using standard drilling equipment. The amount of slurry injected into the contaminated soil or water can be based on the concentration of TCE and the volume of material (i.e., the soil or water) to be treated.

The use of a swellable composite for remediation of chlorinated solvents has several advantages over the use of ZVI alone. Such advantages can include, but are not limited to: (1) toxic dechlorination intermediates (e.g., cis-1,2-dichloroethene and vinyl chloride) can remain entrapped within the swellable composite to facilitate complete dechlorination; (2) the swellable composite can serve as a barrier to dissolved anions, such as carbonate, sulfur species, and metal ions that may poison the ZVI; (3) chlorinated species can be extracted and concentrated near the nano-sized ZVI particles, meaning that much less of the swellable composite needs to be delivered (e.g., injected into an aquifer); (4) the swellable composite is non-toxic and can be left in situ; and (5) the swellable composite can be milled to a particular particle size to optimize delivery (e.g., injection) into various soil types.

The following example is for the purpose of illustration only and is not intended to limit the scope of the claims, which are appended hereto.

EXAMPLE 1

Laboratory experiments have shown that a swellable composite containing ZVI (ZVI-composite) is highly effective in dechlorinating TCE and other species in aqueous solution. Aqueous solutions of 5 ppm TCE were used. To one solution, 0.05% w/v of nano ZVI was added (ZVI-composite). To the other, 0.05% w/v of a ZVI-composite with 0.001% Pd was added (ZVI-Pd-composite). A ZVI-Pd-composite with 3× w/w of citric acid added as a slurry agent (ZVI-Pd-composite+citric acid) was also tested. The solution was capped with a septum and the TCE measured at periods of time using solid-phase microextraction with gas chromatography mass spectroscopy (GC-MS). Detection was done using selected ion mode for maximum selectivity and sensitivity. The concentration of TCE was determined using a calibration curve measured in the same way as the TCE test solutions.

Figure 6:
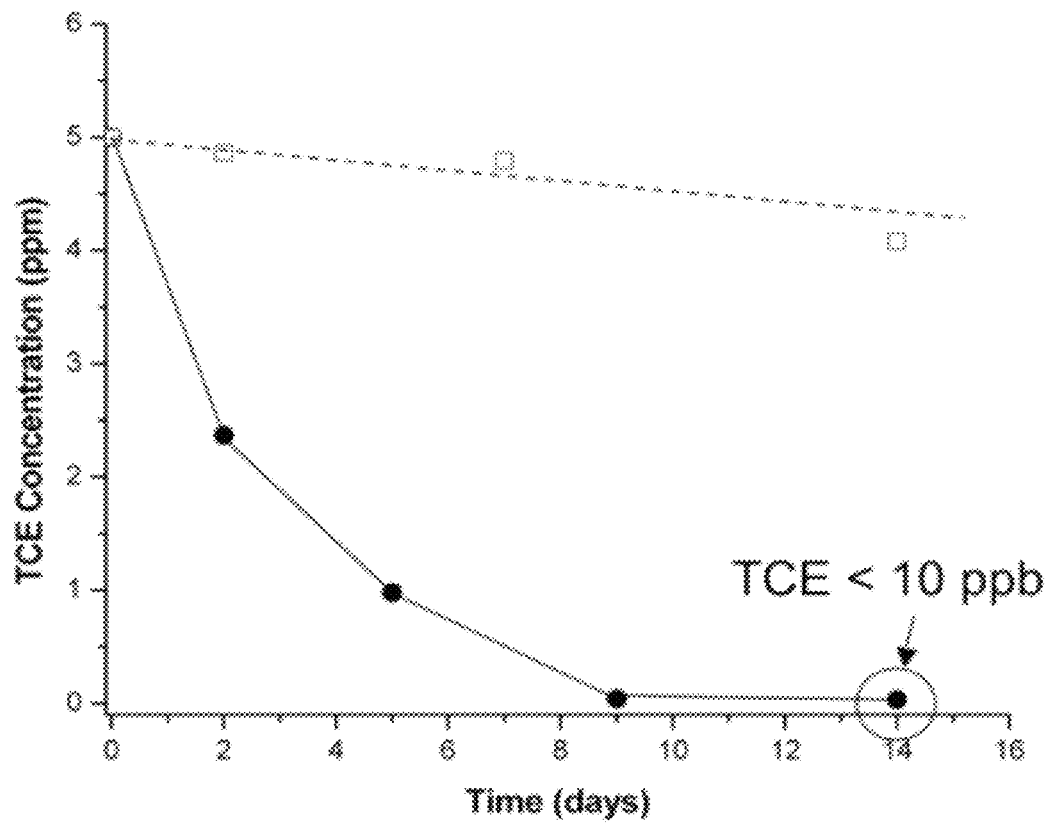
FIG. 6 is a plot of TCE concentration (ppm) versus time (days)

In unstirred aqueous-phase conditions, TCE concentrations drop greater than 99% when using the ZVI-composite. This TCE concentration drop is several orders of magnitude greater than an equivalent mass of ZVI alone. Using environmentally relevant concentrations, the ZVI-composite was found to reduce TCE concentrations from 100 ppb to less than 5 ppb in 7 days under stirred condition and upon addition of 0.0025% w/v of the composite to aqueous solution (FIG. 6). In side-by-side comparisons with ZVI alone, a ZVI-composite that included palladium as a metal catalyst (ZVI-Pd-composite) showed a 10-100× greater rate of dechlorination in unstirred solution (FIG. 6).

Functional capability for vinyl chloride and the various isomers of dichloroethylene has been demonstrated in aqueous solution. Bench-scale groundwater remediation experiments have been performed in soil water columns under flowing conditions: a 0.05% ZVI-Pd-composite was dispersed in a soil water mixture. Under constant flow, the concentration of TCE was reduced from 200 ppb (inlet) to less than 5 ppb on outlet. After extended times, the concentration of TCE was reduced to about 1 ppb. This is likely due to expansion of the composite, which demonstrates greater absorption ability as organic absorbates begin to swell the matrix. Static soil-water batch experiments also have demonstrated that TCE concentrations are rapidly reduced over time upon addition of ZVI-composite materials.

Figure 7:
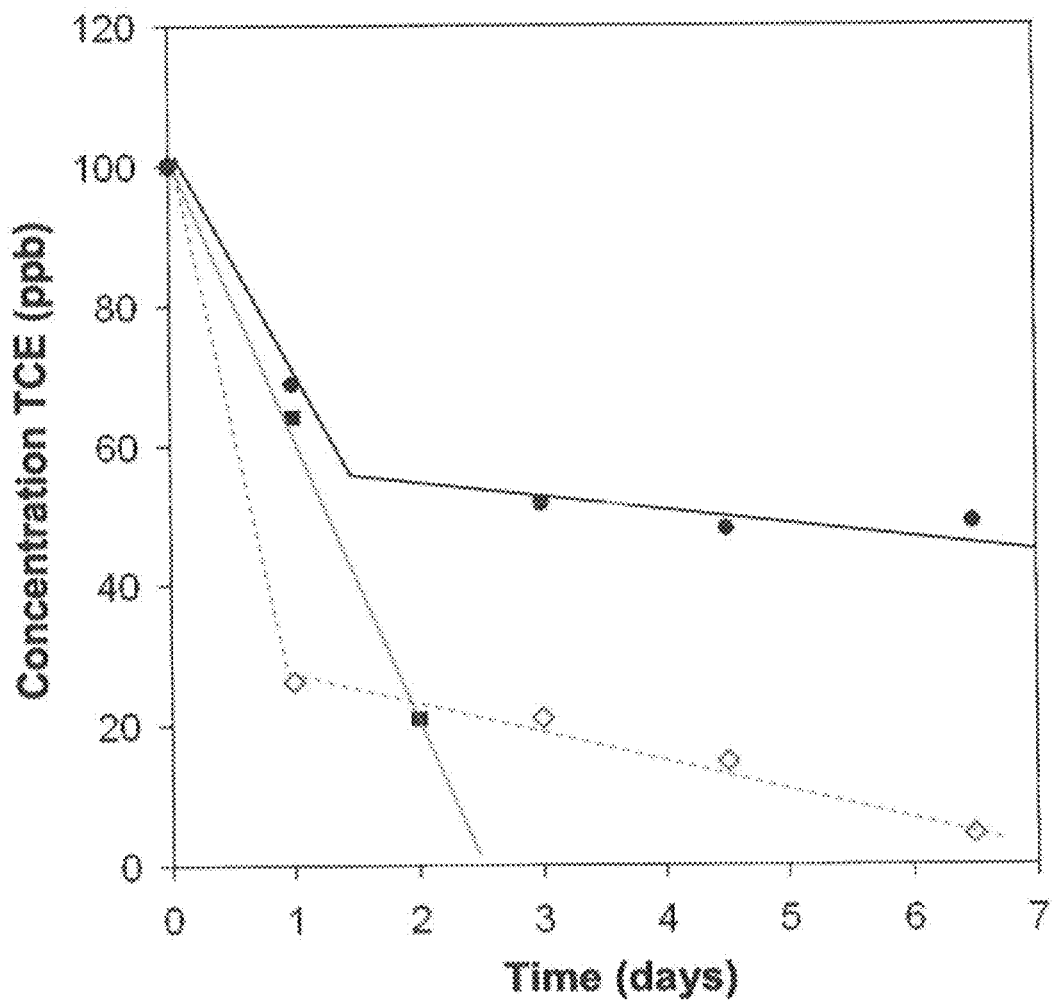
FIG. 7 is a plot of TCE concentration (ppm) versus time (days) showing in situ TCE dechlorination with a swellable composite with 4% nZVI (solid circles), a swellable composite with 4% nZVI and 0.001% palladium catalyst (solid squares), and a swellable composite with 4% nZVI, 0.001% palladium catalyst, and 3× w/w of citric acid (empty diamonds)

As shown in Table 1 and FIG. 7, the addition of metal catalysts (e.g., palladium) and the addition of organic acids increase the rate of dechlorination. Solutions were gently shaken between measurements to ensure good mixing. Time to reach the maximum contaminant level (MCL) was done by measuring the rate of TCE concentration decrease and calculating the days required to go below 5 ppb (EPA MCL level). Materials were added to solution at 0.05% w/v.

TABLE 1

Rate of TCE dechlorination by ZVI-composite materials

| Remediation Material[#] | Percent Initial Extraction | Days to Reach MCL (5 ppb) |
|---|---|---|
| Swellable sol-gel composition only | 66 | n/a |
| ZVI-composite | 62 | 34 |
| ZVI-Pd-composite | 60 | 7 |
| ZVI-Pd-composite + citric acid | 40 | <5 |

[#]25 mg material added to 1 L of water contaminated with 100 ppb TCE.

EXAMPLE 2

A 1 m glass column was filled with 500 g of sand and gravel to which 250 mg of a swellable composite-nZVI-0.001% palladium catalyst was mixed by hand. The packed column was wetted with water containing 200 ppb TCE. Water contaminated with 200 ppb was pumped into the column at a constant flow rate so that it would flow at 0.5 m per day (to simulate groundwater movement). The output from the column was captured in a syringe so that the solution would not be exposed to air (prevents TCE outgassing, which would bias the measurements). Samples from the syringe (output) were tested to determine TCE concentration by the solid phase microextraction GC-MS method (Table 2).

TABLE 2

Groundwater Remediation

| TCE (in) | 200 ppb | |
| TCE (out) | 4.8 ppb | Day 1 |
| | 0.15 ppb | Day 2 |
| | 0.37 ppb | Day 3 |

EXAMPLE 3

Figure 8:
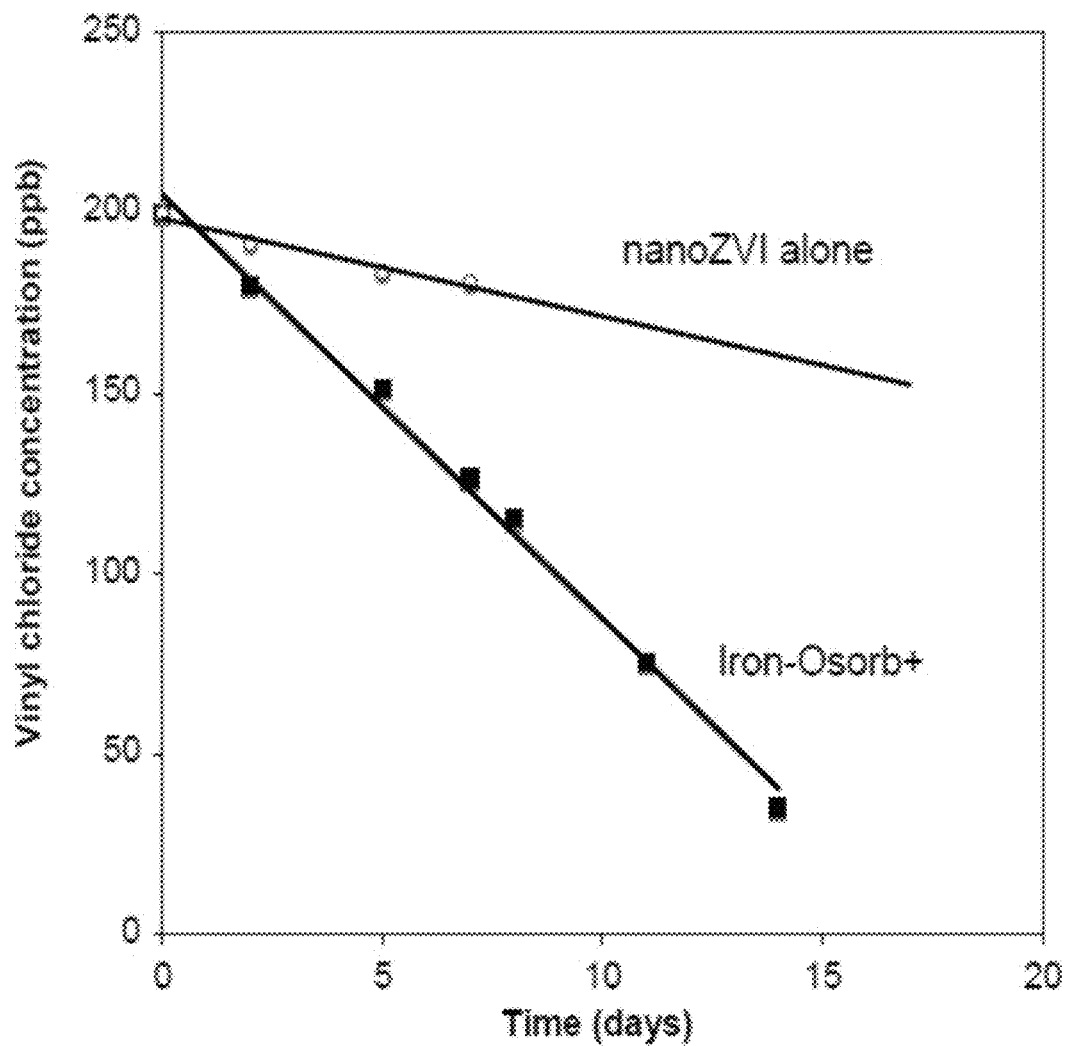
FIG. 8 is a plot of vinyl chloride concentration (ppm) versus time (days) showing reductive dechlorination of vinyl chloride with ZVI alone (empty circles) and a ZVI swellable composite plus palladium (solid squares)
Figure 9:
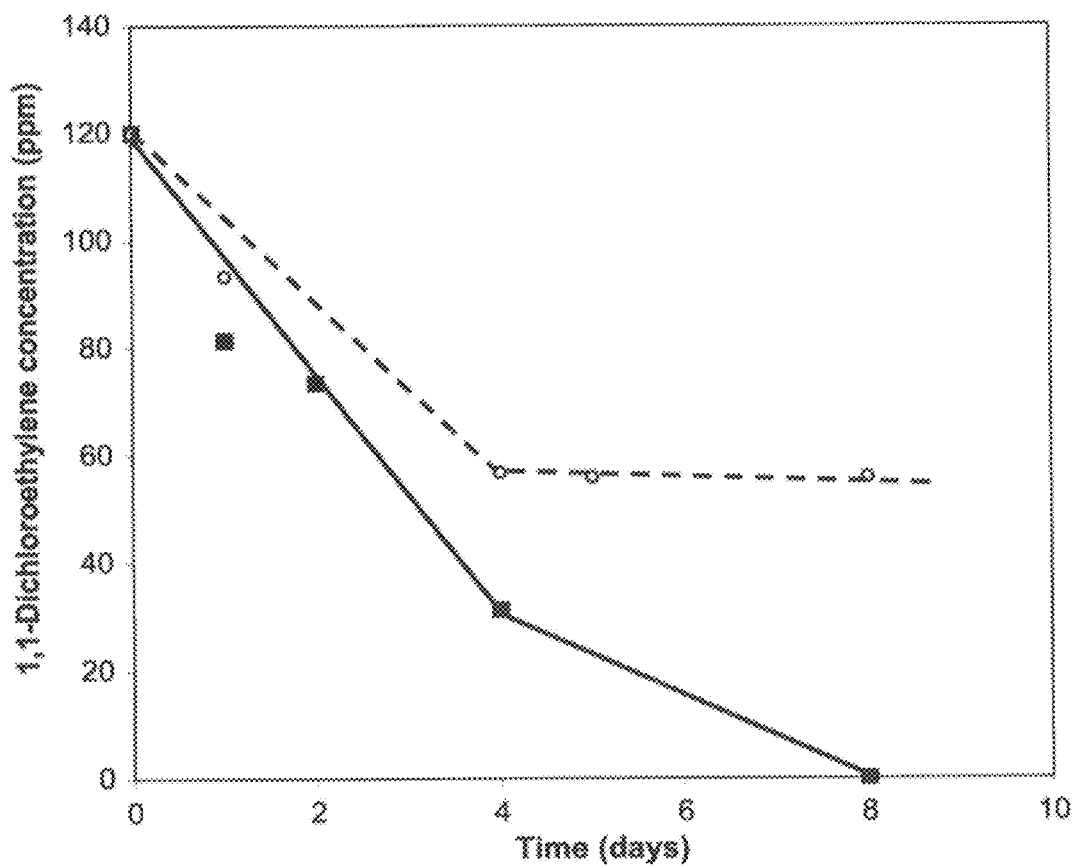
FIG. 9 is a plot of 1,1-Dichloroethylene (1,1-DCE) concentration (ppm) versus time (days) showing reductive dechlorination of 1,1-DCE with ZVI alone (empty circles) and a ZVI swellable composite plus palladium (solid squares)
Figure 10:
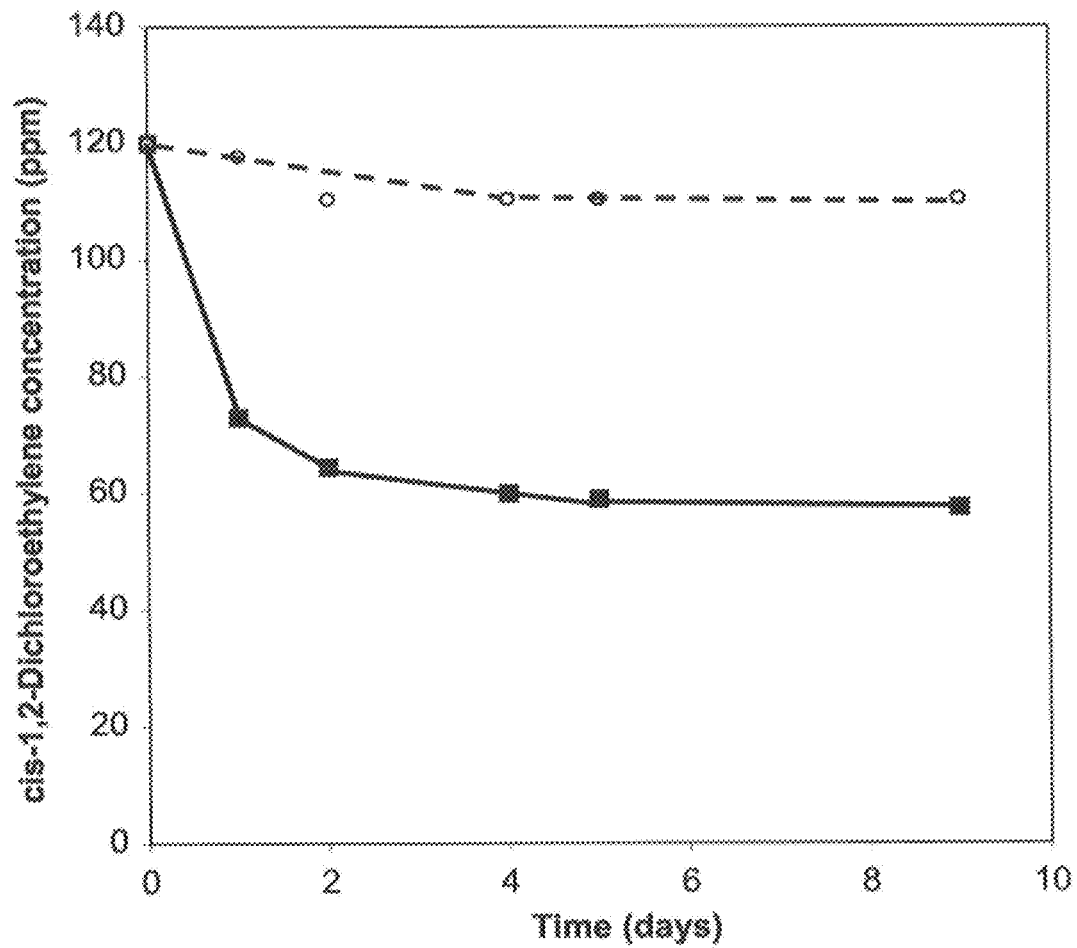
FIG. 10 is a plot of cis-1,2-Dichloroethylene (cis-1,2-DCE) concentration (ppm) versus time (days) showing reductive dechlorination of cis-1,2-DCE with ZVI alone (empty circles) and a ZVI swellable composite plus palladium (solid squares).

FIGS. 8-10 illustrate reactivity of either nZVI alone (empty circles) or a swellable composite with 4% nZVI and 0.001% palladium catalyst (solid squares) to vinyl chloride (FIG. 8), 1,1-Dichloroethylene (1,1-DCE) (FIG. 9), and cis-1,2-dichloroethylene (cis-1,2-DCE) (FIG. 10). Vinyl chloride, 1,1-DCE, and cis-1,2-DCE are the daughter products or intermediates of TCE dechlorination that are often found in groundwater along with TCE. Solutions were made that contained an initial concentration of the dissolved chlorinated species. To one solution was added nZVI, and to another was added the swellable composite with 4% nZVI and 0.001% palladium catalyst. The containers were sealed with a septum to sample without opening the system to the air. The concentration of each species in each solution was measured over time using solid phase microextraction with GC-MS (selective ion mode).

EXAMPLE 4

1 L bottles were filled with sand and gravel saturated with 100 ppb TCE in water. Small water samples (10 mL) were extracted each day for 10 days. After each sample aliquot was taken, the small volume removed was replaced with 100 ppb TCE solution to ensure there was no headspace in the system. The concentration in the samples was measured by solid phase microextraction GC-MS (selective ion mode) (Table 3).

TABLE 3

Effectiveness of ZVI composite materials in situ

| Remediation Materials[§] | TCE Concentration After Day 1 | TCE Concentration After Day 30* |
|---|---|---|
| nanoZVI alone | 100 ppb | 76 ppb |
| swellable composite with 4% nZVI and 0.001% palladium catalyst | 53 ppb | 8 ppb |

[§]25 mg of material added to 1 L TCE contaminated water/top soil mixture.
*Days to reduce TCE concentration from 100 ppb to 5 ppb estimated by dechlorination rate measured over a 10 day period.

From the above description of the invention, those skilled in the art will perceive improvements, changes and modifications. Such improvements, changes, and modifications are within the skill of the art and are intended to be covered by the appended claims.

Having described the invention, the following is claimed:

1. A composite material comprising an aromatically-bridged, organosiloxane sol-gel composition containing a plurality of alkylsiloxy substituents and a non-polar or organic sorbate-reactive particulate material.

2. The composite material of claim 1 wherein the aromatically bridged, organosiloxane sol-gel composition is derived from a trialkoxysilane corresponding to the formula:

(alkoxy)$_3$Si—(CH$_2$)$_n$—Ar—(CH$_2$)$_m$—Si(alkoxy)$_3$ where n and m are individually an integer from 1 to 8, Ar is a single-, fused-, or poly-aromatic ring, and each alkoxy is independently a C$_1$ to C$_5$ alkoxy.

3. The composite material of claim 2 wherein n and m are individually an integer from 1 to 3, Ar is a phenyl, biphenyl or naphthyl ring and each alkoxy is independently a C$_1$ to C$_3$ alkoxy.

4. The composite material of claim 3 wherein the trialkoxysilane is a bis(trialkoxysilylalkyl)benzene.

5. The composite material of claim 4 wherein the bis(trialkoxysilylalkyl)benzene is 1,4-bis(trimethoxysilylmethyl)benzene or bis(trimethoxysilylethyll)benzene.

6. The composite material of claim 2 wherein the alkylsiloxy substituents correspond to the formula:

—O$_x$—S$_1$—R$y$ where R is independently a hydrocarbon containing up to about 30 carbons, x is 1 or 2, y is 2 or 3 and the total of x and y is 4.

7. The composite material of claim 6 wherein R is a straight-chain hydrocarbon, a branched-chain hydrocarbon, a cyclic hydrocarbon or an aromatic hydrocarbon.

8. The composite material of claim 6 wherein the alklysiloxy substituents include at least one heteroatom selected from sulfur, oxygen, nitrogen, phosphorous, a halogen or combinations thereof.

9. The composite material of claim 2 wherein the non-polar or organic sorbate-reactive particulate material is a reactive metal capable of reducing organic sorbates.

10. The composite material of claim 9 wherein the non-polar or organic reactive particulate material is a transition metal capable of reducing organic sorbates.

11. The composite material of claim 10 wherein the transition metal is ZVI, copper, nickel, cobalt, silver, gold, palladium, zinc or platinum.

12. The composite material of claim 10 wherein the transition metal is ZVI present in an amount of from about 0.5% to about 5%, by weight of dried sol-gel composition.

13. The composite material of claim 2 wherein the sorbate-reactive particulate material is a catalyst.

14. The composite material of claim 13 wherein the non-polar or organic sorbate-reactive particulate material includes a metal catalyst coating.

15. The composite material of claim 14 wherein the metal catalyst coating is a transition metal coating.

16. The composite material of claim 15, wherein the transition metal coating is a palladium, nickel or zinc coating.

17. The composite material of claim 13 wherein the particulate material catalyzes the dehalogenation of a halogenated organic sorbate.

18. The composite material of claim 17 wherein the halogenated organic sorbate is PCE, CT, TCE, TCM, cDCE, TBM, tDCE, 12EDB, 11DCE, Freon 113, VC, Freon 11, HCA, 1122TeCA, 123TCP, 1112TeCA, 12DCP, 111TCA, lindane, 112TCA, HCBD, 11DCA, or a polychlorinated biphenyl having the formula C$_{12}$H$_{10-x}$Cl$_x$ where x is an integer >1 and <11.

19. The composite material of claim 2 wherein the non-polar or organic sorbate-reactive particulate material is a reducing agent.

* * * * *